US010458619B2

(12) United States Patent
Huebner et al.

(10) Patent No.: US 10,458,619 B2
(45) Date of Patent: Oct. 29, 2019

(54) LIGHTING DEVICE FOR A MOTOR VEHICLE

(71) Applicant: Volkswagen Aktiengesellschaft, Wolfsburg (DE)

(72) Inventors: Torsten Huebner, Wolfsburg (DE); Gunnar Koether, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 113 days.

(21) Appl. No.: 15/480,444

(22) Filed: Apr. 6, 2017

(65) Prior Publication Data

US 2017/0291533 A1    Oct. 12, 2017

(30) Foreign Application Priority Data

Apr. 6, 2016    (DE) .................. 10 2016 205 644

(51) Int. Cl.
*F21S 43/31*    (2018.01)
*F21S 43/14*    (2018.01)
(Continued)

(52) U.S. Cl.
CPC ............ *F21S 43/31* (2018.01); *B60Q 1/2607* (2013.01); *B60Q 1/2696* (2013.01); *F21S 43/14* (2018.01);
(Continued)

(58) Field of Classification Search
CPC .......... F21S 43/50; F21S 41/148; F21S 43/30; F21S 43/31; F21S 43/14; B60Q 1/2607; B60Q 1/0058; B60Q 1/2696; B60Q 1/30
(Continued)

(56) References Cited

U.S. PATENT DOCUMENTS 5,566,057 A * 10/1996 Iwami .................. B60Q 1/0041
362/549
6,095,672 A * 8/2000 Beninga ............... B60Q 1/2607
362/545
(Continued)

FOREIGN PATENT DOCUMENTS

DE          201 00 918 U1    4/2001
DE    10 2008 034 376 A1    1/2010
(Continued)

*Primary Examiner* — Sean P Gramling
(74) *Attorney, Agent, or Firm* — Muncy, Geissler, Olds & Lowe, P.C.

(57) ABSTRACT

A lighting device for a motor vehicle including a housing covered by a lens in a light main radiation direction, and at least one supporting plate for multiple illuminants. Partially different light functions are assigned to the illuminants. A recess, which is formed by the housing and which forms at least part of the function of a reflector, is assigned to one of the light functions. The recess has a volume which is multiple times smaller compared to the housing volume, and only such a part of the supporting plate, including at least one illuminant, projects into the recess which is multiple times smaller than a remaining part of the supporting plate, which supports the illuminants for the other light functions. Thus, it is possible to implement the additional light function of a side marker light using the compact lighting device, which has few components and is thus cost-effective.

12 Claims, 4 Drawing Sheets

(51) Int. Cl.
  *B60Q 1/26* (2006.01)
  *F21Y 115/10* (2016.01)
  *B60Q 1/30* (2006.01)
  *B60Q 1/32* (2006.01)
  *B60Q 1/34* (2006.01)
  *B60Q 1/44* (2006.01)

(52) U.S. Cl.
  CPC .................. *B60Q 1/30* (2013.01); *B60Q 1/32* (2013.01); *B60Q 1/34* (2013.01); *B60Q 1/44* (2013.01); *F21Y 2115/10* (2016.08)

(58) Field of Classification Search
  USPC ................................................ 362/540–541
  See application file for complete search history.

(56) References Cited

U.S. PATENT DOCUMENTS

| | | | |
|---|---|---|---|
| 6,789,929 B1 | 9/2004 | Doong et al. | |
| 6,851,843 B2 | 2/2005 | Müller et al. | |
| 7,137,718 B2* | 11/2006 | Egashira | B60Q 1/2607 362/19 |
| 7,497,606 B1* | 3/2009 | Tsai | B60Q 1/2607 362/516 |
| 8,235,569 B2* | 8/2012 | Chambers | B60Q 1/2607 362/516 |
| 8,313,223 B2* | 11/2012 | Ota | B60Q 1/0058 362/545 |
| 2013/0272009 A1 | 10/2013 | Fujiu et al. | |
| 2014/0098554 A1* | 4/2014 | Schimon | F21S 43/00 362/512 |

FOREIGN PATENT DOCUMENTS

| | | |
|---|---|---|
| DE | 10 2011 000 697 A1 | 8/2012 |
| DE | 10 2011 000 700 A1 | 8/2012 |
| DE | 10 2011 055 431 A1 | 5/2013 |
| DE | 10 2012 109 491 A | 4/2014 |
| EP | 1 886 871 A1 | 2/2008 |
| EP | 1 898 147 A1 | 3/2008 |
| EP | 2 565 527 A1 | 3/2013 |

* cited by examiner

LIGHTING DEVICE FOR A MOTOR VEHICLE

This nonprovisional application claims priority under 35 U.S.C. § 119(a) to German Patent Application No. 10 2016 205 644.1, which was filed in Germany on Apr. 6, 2016, and which is herein incorporated by reference.

BACKGROUND OF THE INVENTION

Field of the Invention

The invention relates to a lighting device for a motor vehicle.

Description of the Background Art

A lighting device of this type has become known from EP 1 886 871 A1, for example. Specifically, a tail lamp is described, in which multiple light-emitting diodes are mounted on a vertically disposed supporting plate. A light conductor is situated downstream from one part of the light-emitting diodes in the light radiation direction. The light conductor makes it possible to further conduct the light emitted by the light-emitting diodes in a main radiation direction, a tail light function being intended to be implemented by these light-emitting diodes. Another part of the light-emitting diodes situated on the supporting plate is used to generate a side marker light function. Light-deflecting reflector elements, which are connected to a reflector of an adjacent light function to form a single piece, are assigned to each of these light-emitting diodes.

A lighting device for a motor vehicle is disclosed in DE 10 2011 000 700 A1, in which a reflector for generating a main light function has a secondary reflecting surface on its rear side. With the aid of the secondary reflecting surface, light emitted by illuminants may be deflected in another radiation direction and used to form another light function, for example a side marker light function.

The lighting devices known from the prior art appear to be worthy of improvement in light of increasingly stricter requirements with respect to the compactness and simplicity of a lighting device.

SUMMARY OF THE INVENTION

It is therefore an object of the present invention to provide a lighting device for a motor vehicle, which has a compact and simple design despite providing multiple light functions.

An exemplary embodiment of the invention is directed to a lighting device for a motor vehicle, comprising a housing which is covered by a lens in a light main radiation direction, and comprising at least one supporting plate for multiple illuminants, different light functions, in part, being assigned to the illuminants.

A recess, which is formed by the housing and which forms at least part of the function of a reflector, is assigned to one of the light functions. The recess has a volume which is multiple times smaller compared to the volume of the housing. Only one such part of the supporting plate, including at least one illuminant, projects into the recess, this part being multiple times smaller than a remaining part of the supporting plate which supports the illuminant for the other light functions.

This makes it possible to easily add another light function having a compact design to a lighting device which already performs multiple light functions.

The lighting device may be designed, for example, as a tail lamp of a motor vehicle and already facilitate light functions of this type, such as a tail light, a brake light and a direction indicator (blinker).

Due to the design according to the invention, another light function, for example the function of a side marker light, may be implemented in a particularly easy and compact manner.

According to an embodiment, the supporting plate is designed to have an approximately crescent-shaped or triangular contour, including a wider end and a narrower or tapered end. The part of the supporting plate projecting into the recess has the narrower or tapered end of the supporting plate.

These features contribute to a compact structure of the lighting device. In particular, the implementation of a function of a side marker light is elegantly facilitated, in particular in a tail lamp which is fixedly connected to a body of the motor vehicle and follows the class A surface of the body with its lens.

An embodiment provides that, in a mounted position of the lighting device, the supporting plate is oriented horizontally or at least approximately horizontally, and the part of the supporting plate projecting into the recess supports the at least one illuminant for the one light function on an underside.

This contributes to a visually better impression of the lighting device, since in this manner the at least one illuminant for the one light function is not readily visible.

To further contribute to a compactness of the lighting device, the part of the supporting place projecting into the recess does not project over an edge of the recess in the light radiation direction of the at least one illuminant.

An embodiment of the invention proposes to dispose a screen between the housing and the lens. The screen has an opening at least in the area of the recess, the lens being provided with internally disposed optics in the area of the opening.

This may easily help make it possible to achieve a light distribution required for the additional light function. The outwardly directed surface of the lens may also remain smooth, which contributes to an attractive appearance of the lighting device.

An intermediate lens may be disposed between the screen and the housing, at least in areas. An intermediate lens of this type may be use to additionally distribute the light. In this case, it is conceivable to implement the aforementioned, internally disposed optics solely via the intermediate lens.

An embodiment of the invention proposes that the housing is divided into an upper area and a lower area by the supporting plate. A reflector for a first light function is formed by the housing in the upper area, and a reflector for a second light function is formed by the housing in the lower area. A separate reflector for a third light function is disposed in the upper area. The separate reflector has a wall, including an opening, which runs in parallel or at least approximately in parallel to the supporting plate. The opening is situated above at least one of the illuminants assigned to the third light function.

These features contribute to a compact design of the lighting device, despite the combination of multiple light functions. In addition, the at least one illuminant assigned to the third light function may be better concealed from external view in this manner.

According to an embodiment of the invention, it is furthermore proposed that the wall running in parallel to the supporting plate is elongated behind the separate reflector counter to the light radiation direction of the third light function, and the elongation ends with an upwardly directed folded edge, at least one illuminant assigned to the first light function being disposed behind the folded edge on the upper side of the supporting plate.

This contributes to the fact that the at least one illuminant assigned to the first light function is not visible to a viewer from the outside.

The invention also relates to a motor vehicle which is equipped with at least one lighting device according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
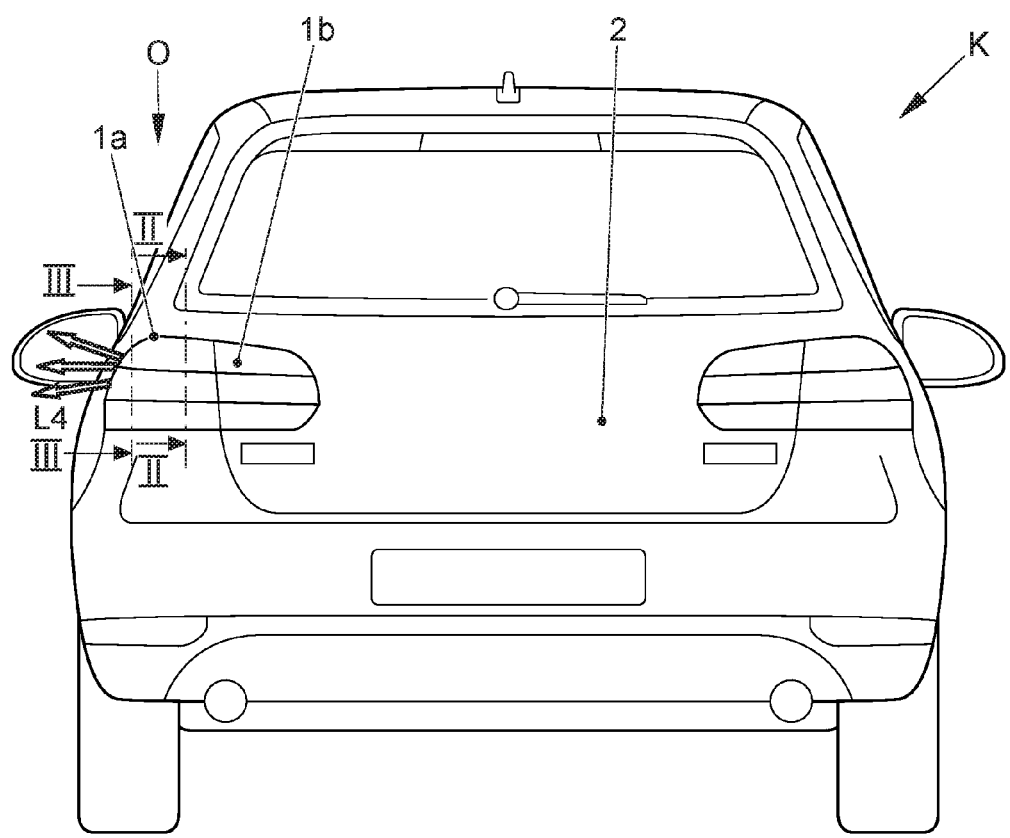
FIG. 1 shows a motor vehicle, including a lighting device according to the invention, from the rear.

A motor vehicle K is illustrated in FIG. 1, which includes lighting device 1a and 1b, designed as tail lights, on its rear side. The lighting devices visible on the right side have an identical design and are not described in greater detail.

Lighting devices 1a and 1b complement each other to form a lighting unit, lighting device 1a being fixedly connected to the vehicle body, and lighting device 1b being fixedly connected to a movable rear hatch 2 of motor vehicle K.

Lighting device 1a has a curved appearance in a view O from above, since it follows the class A surface of the body of motor vehicle K in this location.

Lighting devices 1a. 1b are used to implement multiple light functions, in particular the light functions of tail light, brake light and direction indicator (blinker). In addition, lighting device 1a furthermore facilitates a lateral radiation of light beams L4 and is thus used to implement the light function of a side marker light.

Figure 2:
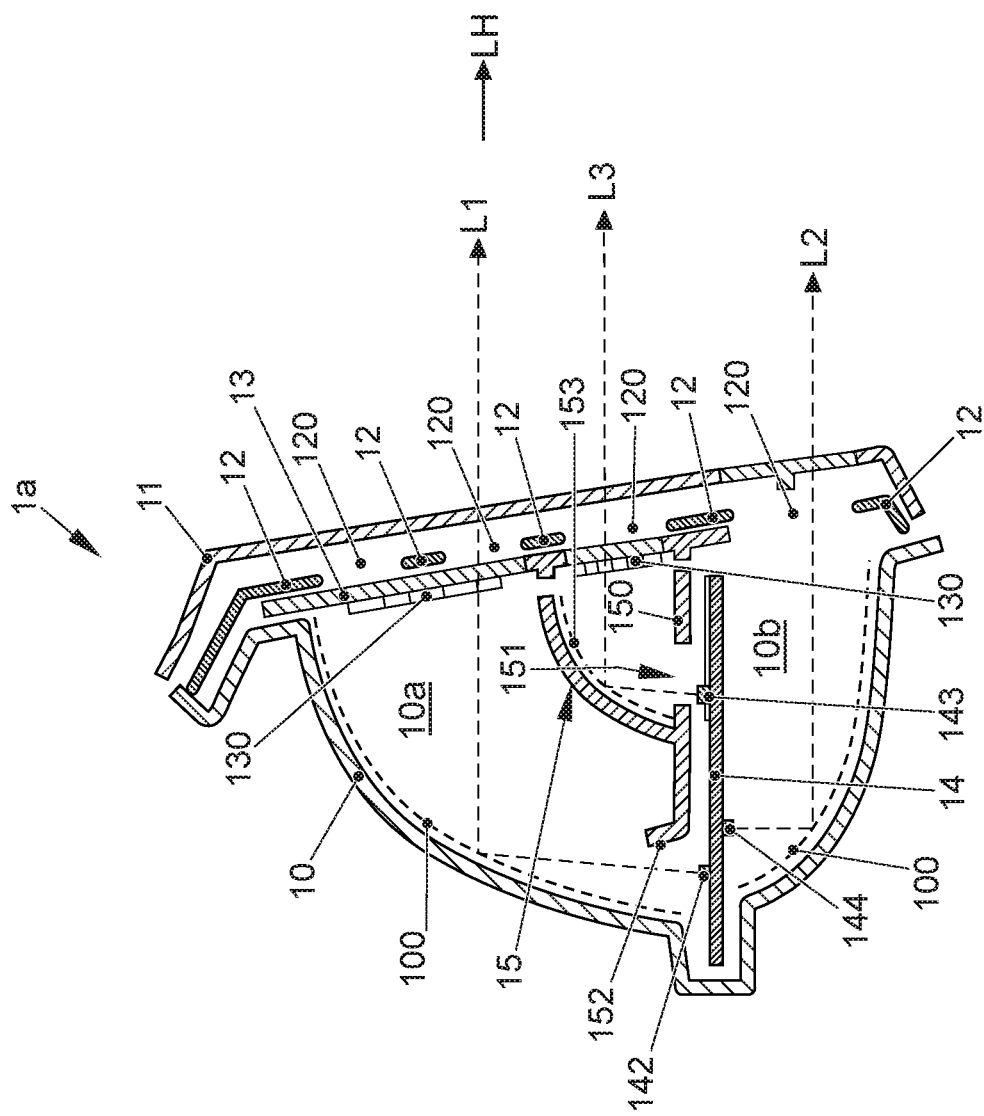
FIG. 2 shows a sectional view of the lighting device according to the invention according to section profile II from FIG. 1.

A longitudinal section of lighting device 1a is illustrated in FIG. 2. Only this lighting device is depicted according to the invention and is therefore not to be described in greater detail below.

Lighting device 1a includes a housing 10, which is covered by a lens 11 in the light main radiation direction LH.

Light main radiation direction LH is oriented counter to the direction of travel, i.e. toward the rear, in a normal direction of travel.

To implement multiple light functions, a supporting plate 14 is accommodated in housing 10 and used to hold illuminants 142, 143 and 144. In each case, multiple illuminants 142 through 144 are present, which each extend in a row over a large part of the width of lighting device 1a (also see FIG. 4).

Specifically, supporting plate 14 is designed as a circuit board and is oriented approximately horizontally in a mounting position of lighting device 1a. Illuminants 142 through 144 are designed as light-emitting diodes (LEDs).

Illuminants 142 are thus used to implement a first light function L1, which is to be equated with a light beam L1 illustrated by way of example.

Illuminants 144 are used to implement a second light function L2, which is equated with a light beam L2 illustrated by way of example.

Finally, illuminants 143 are used to implement a third light function L3, which is equated with a light beam L3 illustrated by way of example. Illuminants 142 and 143 are disposed on the upper side of supporting plate 14, and illuminants 144 are disposed on the underside of supporting plate 14.

Although illuminants 142 through 144 are designed as light-emitting diodes, it is also conceivable in certain circumstances to provide the illuminants with a different design, for example as conventional incandescent lamps. A combination of different illuminants is also possible.

Housing 10 is furthermore divided into an upper area 10a and into a lower area 10b by horizontally oriented supporting plate 14.

Upper area 10a takes up approximately two thirds of the volume of lighting device 1a formed by lens 11 and housing 10. Lower area 10b takes up approximately one third of this volume.

In addition, the interior of housing 10 is provided with a reflective coating 100. Reflective coating 100 may be, for example, an aluminum vapor deposition.

Coating 100 makes it possible for housing 10 itself to largely perform the function of a reflector and thus to eliminate components for reflectors.

Viewed in light radiation direction LH, a screen 12 is disposed between lens 11 and housing 10. Screen 12 has multiple openings 120, through which light beams L1, L2 and L3 may pass to the outside through lens 11.

Furthermore, an intermediate lens 13 is positioned between screen 12 and housing 10, also viewed in light main radiation direction LH.

Intermediate lens 13 may have optics 130 facing housing 10, which are used to support a required light distribution for light functions L1, L2 and/or L3.

A separate reflector 15 is disposed above supporting plate 14. Reflector 15 extends approximately over a large part of the width of lighting device 1a and also has a reflective coating 153. It is assigned to illuminants 143 and contributes to the implementation of third light function L3. Specifically, it has a wall 150 for this purpose, which is oriented approximately in parallel to supporting plate 14 and is provided with an opening 151. Opening 151 is disposed above illuminants 143. Light beams L3 may thus pass unhindered from illuminants 143 through opening 151 and strike reflector 15. A visibility of illuminants 143 from the outside is nevertheless not possible in this manner.

Moreover, wall 150 forms an elongation up to behind reflector 15, which ends at an upwardly facing folded edge 152. Illuminants 142 are disposed diagonally below this folded edge 152. They are not visible from the outside, due to folded edge 152.

In the present exemplary embodiment, light function L1 is designed as a tail light, light function L2 is designed as a direction indicator (blinker) and light function L3 is designed as a brake light.

Figure 3:
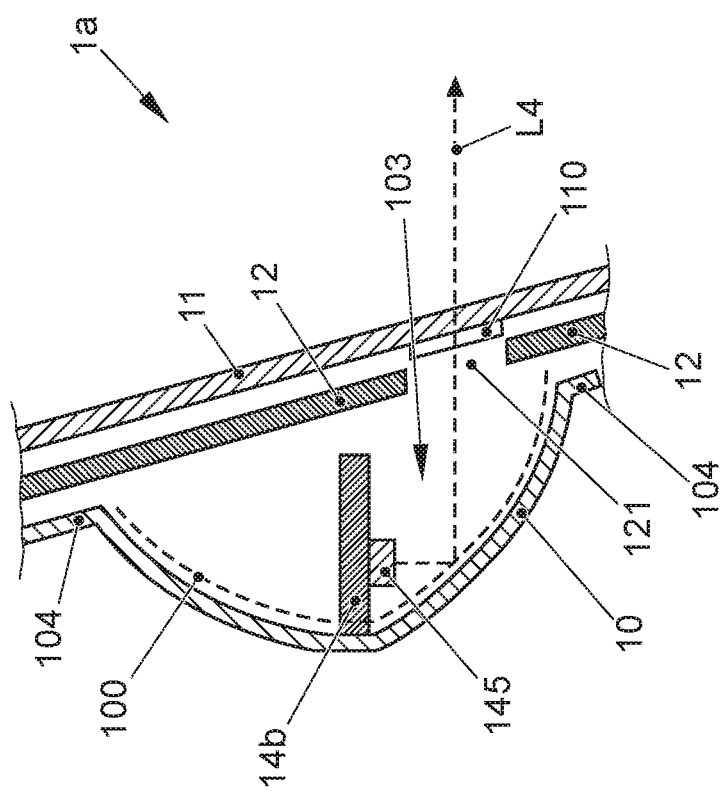
FIG. 3 shows a sectional view of the lighting device according to the invention according to section profile III from FIG. 1.
Figure 4:
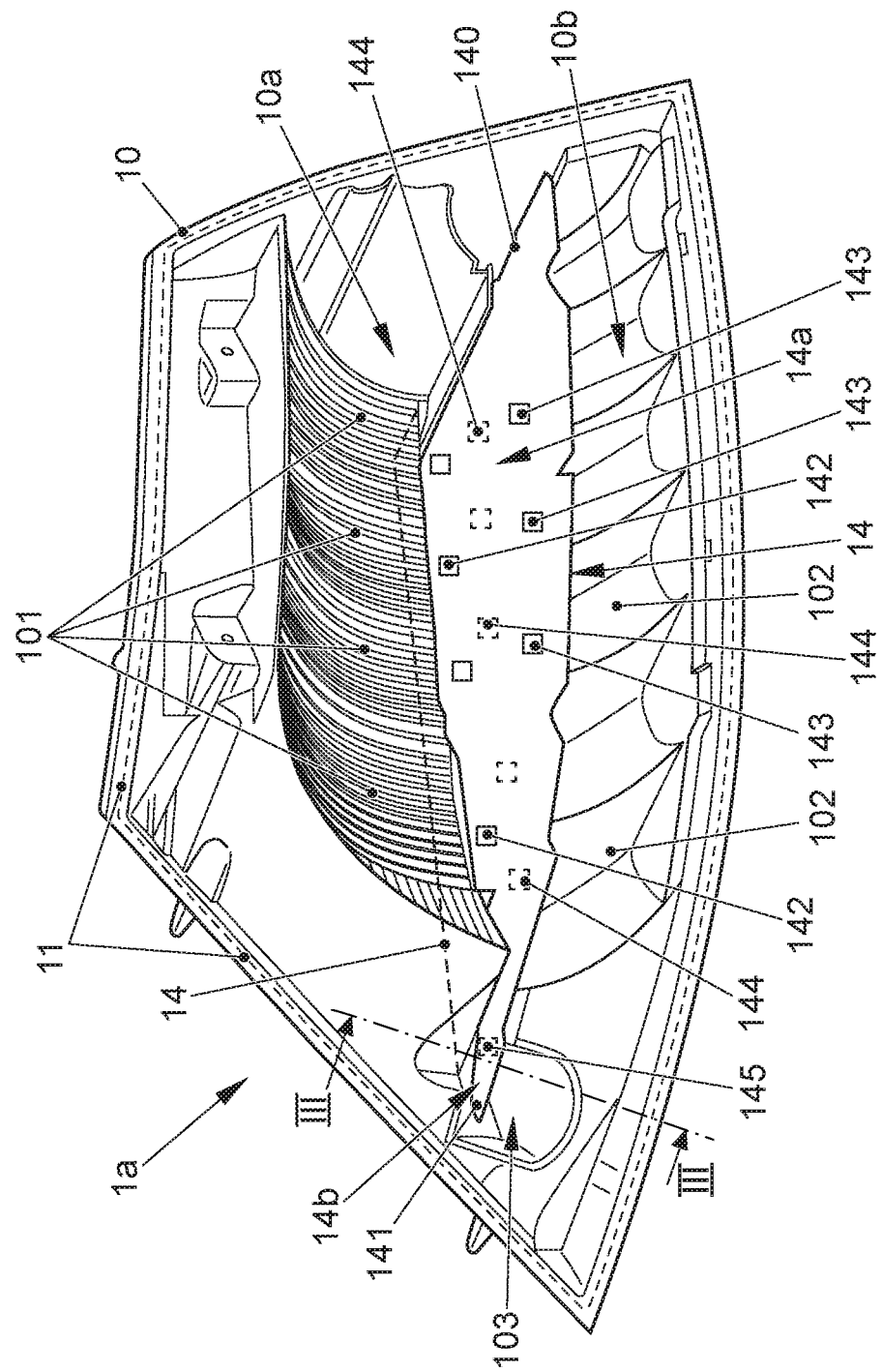
FIG. 4 shows a perspective representation of the exemplary embodiment of the lamp according to the invention, not all parts being illustrated for the sake of clarity.

To be able to now easily implement another light function, namely aforementioned light function L4 of a side marker light, a recess 103 is introduced into housing 10 in a lateral area of lighting device 1a, as is apparent from FIGS. 3 and 4.

In order for this recess 103 to be able to perform a reflector function without a separate reflector, recess 103 is also provided with a reflective coating 100.

As is apparent from FIG. 4, recess 103 has a volume covered by a lens 11 (indicated only by the dashed line), which is multiple times smaller than the volume covered by aforementioned areas 10a, 10b and lens 11.

Furthermore, only such a part 14b of supporting plate 14 which is many times smaller than a remaining part 14a of supporting plate 14, which divides housing 10 into aforementioned areas 10a and 10b, or which is used to implement the other light functions L1 through L3, projects into recess 103.

Illuminants 142 and 143 situated on the upper side of supporting plate 14 and illuminants 144 situated on the underside thereof are indicated (only by the dashed line) on the supporting plate.

For the sake of improved clarity, some of the components apparent in the other figures, such as reflector 15 and screen 12, are not illustrated in FIG. 4.

Housing 10 has six housing segments 101 in upper area 10a and six housing segments 102 in lower area 10b.

Housing segments 101, 102 are assigned to illuminants 142 and illuminants 144 respectively, and form a type of partial reflector.

As is apparent, in particular, from FIG. 4, supporting plate 14 has an approximately crescent-shaped or triangular contour, including a wider end 140 and including a narrower, tapered end 141. End 141 is an integral part of part 14b of supporting plate 14 projecting into recess 103.

In this manner, additional light function L4 may be implemented without having to provide a separate supporting plate for this light function. This makes it possible to eliminate components and manufacturing costs.

It is apparent from FIG. 3 that only one illuminant 145 is mounted on the underside of part 14b of supporting plate 14 projecting into recess 103. Illuminant 145 is also designed as a light-emitting diode. However, multiple illuminants 145 may also be present.

It is apparent that screen 12 is also disposed in the area of recess 103. However, screen 12 has an opening 121 in the area of recess 103, through which light beam L4 illustrated by way of example may exit, which is equated with the light function of the side marker light.

However, lens 11 has only one set of optics 110 in the area of opening 121, which may be designed, for example, as cushion optics.

Optics 110 help achieve a desired light distribution of light function L4.

If should furthermore be noted that recess 103 extends away from an edge 104 of housing 10, part 14b of supporting plate 14 not projecting over edge 104, viewed in a light radiation direction of light beam L4. This contributes to a compact design of lighting device 1a in this area.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for a motor vehicle, the lighting device comprising:
   a housing that is covered by a lens in a light main radiation direction;
   at least one supporting plate for multiple illuminants, different light functions being assigned to the illuminants; and
   a recess formed in a wall of the housing that at least partially provides a function of a reflector and is assigned to one of the light functions, the recess having a volume that is multiple times smaller compared to a remainder of the housing volume, and only a part of the supporting plate including at least one of the illuminants projects into the recess, the part of the supporting plate being multiple times smaller than a remaining part of the supporting plate that supports the illuminants for the other light functions,
   wherein the at least one supporting plate and the part of the supporting plate that projects into the recess together form a single flat plate that defines a single plane, and
   wherein a screen is arranged between the housing and the lens, the screen having an opening at least in an area of the recess.

2. The lighting device according to claim 1, wherein the supporting plate has a crescent-shaped or triangular contour, including a wider end and a narrower or tapered end, and wherein the part of the supporting plate projecting into the recess has the narrower or tapered end of the supporting plate.

3. The lighting device according to claim 1, wherein the supporting plate is oriented horizontally in a mounting position of the lighting device, and wherein the part of the supporting plate that projects into the recess supports, on an underside thereof, the at least one of the illuminants for the one of the light functions.

4. The lighting device according to claim 3, wherein the part of the supporting plate that projects into the recess does not project over an edge of the recess, viewed in the light main radiation direction of the at least one of the illuminants.

5. The lighting device according to claim 1, wherein the lens is provided with internally disposed optics in an area of the opening of the screen.

6. The lighting device according to claim 5, wherein an intermediate lens is disposed between the screen and the housing, at least in areas.

7. A motor vehicle comprising at least one lighting device according to claim 1.

8. The lighting device according to claim 5, wherein the housing is divided into an upper area and a lower area by the supporting plate, wherein a reflector for a first light function is formed by the housing in the upper area and a reflector for a second light function is formed by the housing in the lower area, and wherein a separate reflector for a third light function is arranged in the upper area, the separate reflector including a wall running substantially parallel to the supporting plate and the wall of the separate reflector having an opening, the opening of the wall of the separate reflector being disposed above at least one of the illuminants assigned to the third light function.

9. The lighting device according to claim 6, wherein the intermediate lens is provided with internally disposed optics.

10. The lighting device according to claim 8, wherein an intermediate lens is disposed between the lens and the housing, and wherein one end of the separate reflector and one end of the wall of the separate reflector are directly connected to the intermediate lens.

11. A lighting device for a motor vehicle, the lighting device comprising:
- a housing that is covered by a lens in a light main radiation direction;
- at least one supporting plate for multiple illuminants, different light functions being assigned to the illuminants; and
- a recess formed in a wall of the housing that at least partially provides a function of a reflector and is assigned to one of the light functions, the recess having a volume that is multiple times smaller compared to a remainder of the housing volume, and only a part of the supporting plate including at least one of the illuminants projects into the recess, the part of the supporting plate being multiple times smaller than a remaining part of the supporting plate that supports the illuminants for the other light functions, wherein the at least one supporting plate and the part of the supporting plate that projects into the recess together form a single flat plate that defines a single plane, and wherein the housing is divided into an upper area and a lower area by the supporting plate, wherein a reflector for a first light function is formed by the housing in the upper area and a reflector for a second light function is formed by the housing in the lower area, and wherein a separate reflector for a third light function is arranged in the upper area, the separate reflector including a wall running substantially parallel to the supporting plate and the wall of the separate reflector having an opening, the opening of the wall of the separate reflector being disposed above at least one of the illuminants assigned to the third light function.

12. The lighting device according to claim 11, wherein the wall running substantially parallel to the supporting plate is elongated behind the separate reflector counter to a light radiation direction of the third light function, and wherein the elongation ends with an upwardly directed folded edge, and wherein at least one of the illuminants assigned to the first light function is disposed behind the folded edge on an upper side of the supporting plate.

* * * * *